United States Patent [19]

Papineau

[11] E Re. 30,145

[45] Reissued Nov. 13, 1979

[54] ENERGY GENERATING SYSTEM

[75] Inventor: Ronald I. Papineau, Goshen, Mass.

[73] Assignee: Unique Energy Systems, Inc., Amherst, Mass.

[21] Appl. No.: 920,859

[22] Filed: Jun. 30, 1978

Related U.S. Patent Documents

Reissue of:

[64] Patent No.: 3,967,589
Issued: Jul. 6, 1976
Appl. No.: 544,400
Filed: Jan. 27, 1975

[51] Int. Cl.[2] ..... F22B 1/00

[52] U.S. Cl. ..... 122/4 R; 55/158; 431/243; 422/285

[58] Field of Search ..... 122/4; 23/281; 55/158, 55/16; 431/2, 243

[56] References Cited

U.S. PATENT DOCUMENTS

| | | | |
|---|---|---|---|
| 1,225,262 | 5/1917 | Messerschmitt | 23/281 |
| 3,350,176 | 10/1967 | Green et al. | 23/281 |
| 3,682,142 | 8/1972 | Newkirk | 23/281 X |
| 3,780,496 | 12/1973 | Ward et al. | 55/16 |
| 3,795,087 | 3/1974 | Kamei et al. | 55/16 |

*Primary Examiner*—Edward G. Favors
*Attorney, Agent, or Firm*—Morgan, Finnegan, Pine, Foley & Lee

[57] ABSTRACT

Energy system in which steam is generated by combustion of hydrogen in ozone enriched air. The steam so generated [is supplied to an asymmetric microporous membrane which causes chemical disassociation of the steam to yield hydrogen and oxygen.] *is further heated and activated and the gases from the activated steam are fed to an asymmetric membrane which diffuses only hydrogen therethrough.* The hydrogen gas is used to maintain combustion in a closed power generating system.

11 Claims, 4 Drawing Figures

ENERGY GENERATING SYSTEM

Matter enclosed in heavy brackets [ ] appears in the original patent but forms no part of this reissue specification; matter printed in italics indicates the additions made by reissue.

BACKGROUND

Hydrogen, because of its vast abundance in the water molecule has been recognized for some time as the primary candidate to replace the world's rapidly dwindling fossil fuel reserves. Of course, the major drawback heretofore encountered in attempting to use hydrogen as an energy source has been the lack of an economically feasible process for obtaining hydrogen.

The principle object of this invention is to provide an efficient energy generating system characterized by its minimal fossil fuel requirements.

Another object of this invention is to provide a microporous membrane which is uniquely adapted to cause [disassociation of] *diffusion of hydrogen from* high energy steam *which has been activated* into its component elements of hydrogen and oxygen.

A further object of this invention is to use a membrane of the above type in combination with a steam generator utilizing hydrogen as the primary fuel source for combustion.

The above and other objects of this invention will be more readily apparent from the following description and with reference to the accompanying drawings, in which FIG. 1 is an elevational view of one type of hydrogen generator embodying the concept of my invention;

Figure 1:
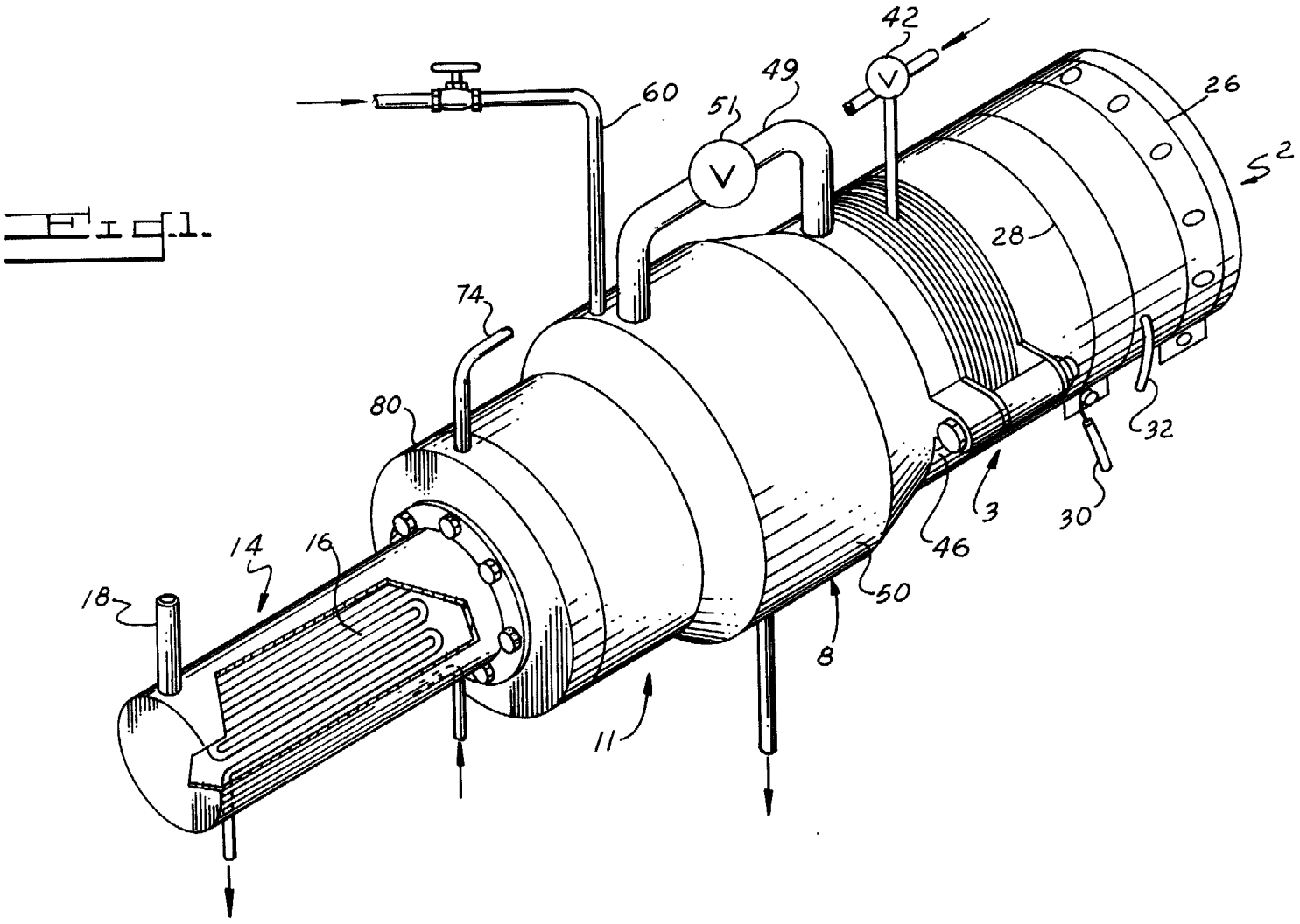

Referring in detail to the drawings, an ozone generator is shown generally at 2. The outlet end of the ozone generator is connected end-to-end with a tubular heat exchanger 3. A combustion nozzle 4 (FIG. 2) extends outwardly from the heat exchanger and is disposed within the combustion chamber of a boiler or steam generator, indicated generally at 8, in which steam is developed by the heat of combustion derived from the fuel which issues from the nozzle 4. [Steam] *Gases formed from steam* from the boiler 8 [is ultimately] *are* fed to a diffusion membrane cartridge 11, which causes [molecular disassociation of the steam into hydrogen and oxygen gas] *diffusion of hydrogen from the gases to pass therethrough.* An economizer or heat exchanger 14 (FIG. [2] *1*) receives the gaseous combustion products from the combustion chamber of the boiler 8. These hot gases impinge upon a tube formed as a coil 16 disposed within the heat exchanger. Water in the coil is heated for any use in any energy consuming system, such as for a steam or hot water supply system or heating system for industrial, commercial or residential purposes. Exhaust gases from the heat exchanger are vented to the atmosphere by a stack 18.

The ozone generator 2 comprises a tubular housing or shell 20 (FIG. 2) formed of any suitable material, such as a heat resistant synthetic plastic with an axial core 22 spaced from the inner surface of the shell 20 by means of radially extending ribs 23. At its inlet end, the housing includes a plurality of circumferentially spaced ports 24 opening into the annular chamber provided between the core 22 and the shell 20 of the generator. A plate 26 is disposed about the outer surface of the generator and includes a number of circumferentially spaced holes corresponding in number to the ports 24. The plate is rotatable to vary alignment of its holes in relation to the ports 24, thereby providing means for regulating the quantity of air supplied to the generator. A metallic plate 28 is fitted around the periphery of the shell 20 and is connected to a source of electrical potential by means of a cable 30. A second electrical cable 32 extends through the wall of the shell and is connected to a metallic plate 34 fitted around the outer surface of the core 22 in radially spaced relation to the plate 28. The space provided between the plates 28 and 34 and the voltage applied thereto is selected to produce an ozone enriched air supply for use in the combustion chamber 36 of the steam boiler 8. A circulating fan (not shown) may be provided to insure an adequate supply of air to the combustion chamber.

The heat exchanger 3 commonly known as a heat sink maintains a zone of moderate temperature between the ozone generator which utilizes air at ambient temperature and the high temperatures of combustion chamber 36 of the boiler. The heat sink comprises a cylinder, fabricated of a suitable metallic material, such as aluminum, with a radially extending spider 38 for supporting the nozzle 4. The outer surface of the heat sink unit is provided with a plurality of radially extending, laterally spaced fins 39 for the rapid dissipation of heat from within the heat sink to the surrounding air. This unit protects the plastic ozone generator from damage caused by overheating. The fuel nozzle or metering device 4 extends from the spider 38 to a point centrally of the combustion chamber 36 of the boiler. The nozzle is supplied by way of appropriate tubing connections as shown generally at 40 with a suitable combustible fuel, such as propane or other liquified petroleum. A regulator valve 42 is provided for controlling the flow of propane and/or a hydrogen gas to the nozzle, as will be more fully explained.

Electrodes 44, connected to a suitable source of electrical potential (not shown), extend from the spider 38 of the heat sink and are positioned relative to the nozzle for ignition of the fuel mixture issuing therefrom. The voltage employed causes ignition of the fuel and serves to establish and maintain a stable flame front pattern. Should the hydrogen supply furnished to the nozzle 4 become spasmodic, the continuous ignition current will control the flame, preventing explosions and assuring regular flame patterns, with a resultant positive controlled generation of heat. As shown in FIG. 1, the heat sink cylinder abuts an end cap 46 which has an annular recess or chamber 48 opening toward the steam boiler 8. A pipe or conduit 49 provides a passage to chamber 48 for steam generated in the jacket 50 of the boiler and a regulator valve 51 may be provided in this line to control the flow of steam from the boiler to the chamber 48.

In general, the boiler 8 comprises the combustion chamber 36 disposed centrally of a plurality of axially extending circumferentially spaced tubes 52 supported at their outer ends by a pair of apertured end plates 53 and 54. The boiler includes a steam jacket 50 which takes the form of an annular chamber disposed circumferentially about the combustion chamber 36 and is defined by an inner cylindrical wall 56 and an outer cylindrical wall of substantially larger diameter. The end portions of the outer wall taper inwardly to form a closed steam chamber. Feed water is supplied to the boiler jacket by inlet tube 60 and a drain tube 61 is provided for the combustion chamber to enable drainage of excess moisture from the chamber caused by hydrogen combustion in air.

The highly exothermic combustion of the hydrogen and ozone enriched air within the chamber 36 rapidly and efficiently heats the water in the jacket sufficiently to generate steam which is conducted by the pipe 49 to the end cap 46 and valve 51 regulates steam flow from the boiler. From the end cap the steam passes through the axially extending boiler tubes 52 surrounding the combustion chamber wherein the steam is further heated and activated[. This highly active steam is] *to form gases which are* then conducted to an asymmetric microporous membrane cartridge 11 which as shown includes a plurality of membrane elements 62, each disposed in axial alignment with a boiler tube 52 to receive the *gases from the further heated and activated* steam issuing therefrom.

Figures 2, 3, 4:
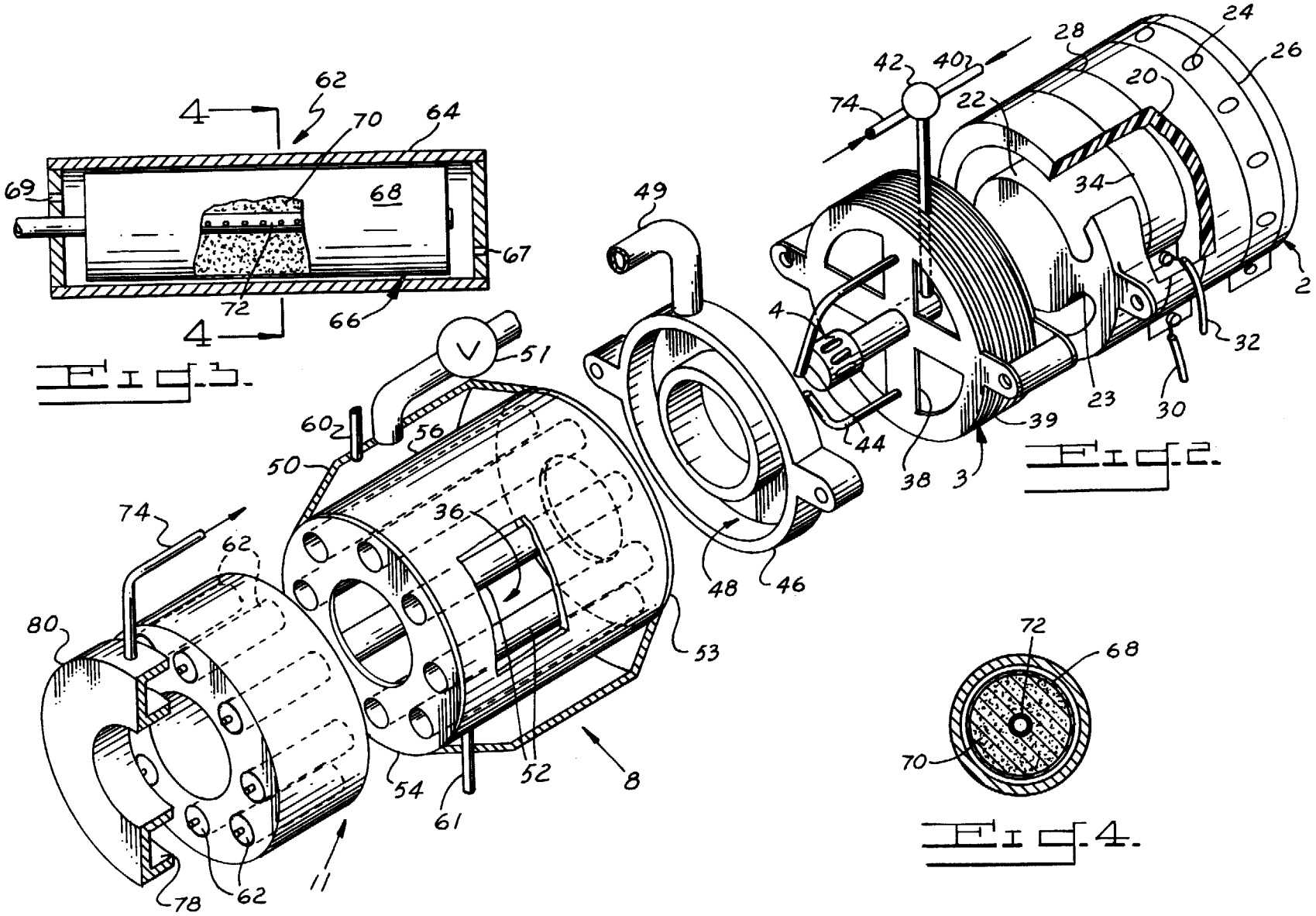
FIG. 2 is an exploded view of the generator of FIG. 1 with parts thereof in section.
FIG. 3 is a cross sectional view on an enlarged scale of a component of the generator of FIG. 1.
FIG. 4 is a cross section taken along line 4—4 of FIG. 3.

Each membrane element consists of a tubular shell or housing 64 (FIG. 4) within which is disposed an active microporous membrane, indicated generally at 66. The active membrane is composed of a thin film or sheet material 68 of a dense polymer, *such as a polymer selected from the group consisting of cellulose diacetate and dimethyl silicon,* on the order of 0.25 micron in thickness supported about the circumference of a porous support or substrate 70 of about 100 microns in thickness or diameter. The porous substrate provides the necessary strength for the extremely thin active layer and may be of cylindrical configuration supported on a central tube 72 having perforations within the porous substrate to receive the disassociated hydrogen gas. At the inlet or high pressure end it is said that the input vapor dissolves into the member while at the low pressure or outlet end the gas is said to evaporate from the active membrane. Diffusion through the membrane is described by the equation $\phi\ dC/_{dx}$ where $\phi$ is the flow rate in volume per unit area, D is the diffusion constant, C is the volume concentration of the dissolved gas and dC/dX is the concentration gradient across the membrane. While the principle of operation of these membranes is not fully explainable in terms of conventional physical concepts, it is postulated that hydrogen gas will be produced at the outlet end of the membranes. This gas may be conducted by suitable tubing 74 which connects from the annular chamber 78 of the end cap 80 similar to end cap 46, to the regulator valve 42 by which it is fed to the combustion nozzle 4. If necessary the gas may be collected in a reservoir or tank by bubbling through water. The valve 42 may be adjusted to reduce and/or eliminate the supply of other combustible gas being supplied to the nozzle proportionately to the increase in the production of hydrogen. The tubular shell 64 of each membrane, as best shown in FIG. 3, is provided with an inlet opening 67 and an outlet port 69. The outlet port of each membrane shell serves as a discharge for the water containing such oxygen as is present in the system with hydrogen permeation through the membrane. This water borne oxygen discharged through the port 69 may be connected to any suitable collection or distribution system. While not shown, another system of asymetric membranes could be provided for oxygen permeation and recovery. The recovered oxygen could, for example, be fed back to the combustion chamber ozone generator to enhance the hydrogen combustion or removed from the system for other suitable purposes.

Heat exchanger 14 receives combustion gases from the combustion chamber 36 of the boiler and the thermal energy of these gases is utilized to heat water in the tubular coil 16. This heated water may be used as previously indicated in any desirable energy consuming system.

Having thus described my invention, what is claimed is:

1. Energy generating system comprising a steam generator, a combustion chamber, fuel supply means for introducing a combustible mixture into said chamber, means for supplying water to said generator for conversion to steam by combustion of said mixture, *means connected to said steam generator means for further heating and activating said steam by combustion of said mixture to form gases* feed means for supplying said *gases from such further heated and activated* steam to an asymmetric microporous membrane which produces hydrogen by [chemical disassociation of said steam,] *diffusion of hydrogen therethrough from said gases* and conduit means for supplying at least part of the hydrogen gas so produced to said combustion chamber for maintaining combustion therein.

2. Energy generating system as set forth in claim 1 in which is provided a heat exchanger having a water carrying coil in a chamber disposed to receive the gaseous products of combustion from said steam generator, said combustion products providing thermal energy to heat the water in said coil for use in an energy consuming system.

3. Energy generating system as set forth in claim 1 in which said asymmetric membrane comprises a thin, dense polymer layer disposed about the circumference of a porous substrate.

4. Energy generating system as set forth in claim 3 in which said dense layer is selected from the group consisting of cellulose diacetate and dimethyl silicon.

5. Energy generating system as set forth in claim 3 in which said dense polymer layer has a thickness on the order of ¼ microns in said porous substrate and has a cross section of approximately 100 microns.

6. Energy generating system as set forth in claim 5 in which said polymer layer and porous substrate are of generally cylindrical cross section disposed in a cylindrical shell, said shell having an inlet opening to receive said *gases from said further heated and activated* steam and an outlet for said hydrogen.

*7. Energy generating system comprising:*

*a steam generator,*

*a combustion chamber,*

*fuel supply means for introducing a combustible mixture into such chamber,*

*means connected to said generator for supplying water thereto for conversion to steam by combustion of said mixture,*

*means connected to said steam generating means for further heating and activating said steam by combustion of said mixture to form gases,*

*a microporous membrane adapted to diffuse hydrogen, and*

*feed means connected to said steam activating means for supplying said gases from said activated steam to said microporous membrane through which only hydrogen diffuses, to thereby produce hydrogen from said water.*

*8. Energy generating system comprising:*

*a combustion chamber in which the heat of combustion is used for the generation of steam and for further heating and activating said steam,*

*means operatively connected to said combustion chamber for providing the heat of combustion therewithin,*

*means about said combustion chamber for generating steam from water by the heat of said combustion,*

*means for supplying water to said generator for conversion to steam,*

*means within said generator for further heating and activating said steam from the heat of said combustion to form gases therefrom,*

*means for supplying the steam from said steam generating means to said steam activating means,*

*a microporous membrane adapted to diffuse hydrogen, and*

*feeding means connected to said steam activating means and to said microporous membrane for supplying thereto said gases from said activated steam and wherein said microporous diffuses only hydrogen therethrough, to thereby produce hydrogen from water.*

*9. An energy generating system comprising:*

*a generator for producing hydrogen from water including:*

*a combustion chamber,*

*a plurality of axially extending circumferentially spaced tubes about said combustion chamber,*

*a steam generator about said tubes and said combustion chamber,*

*fuel supply means for introducing a combustible mixture into said chamber,*

*means for supplying water to said generator for conversion to steam by combustion of said mixture, and*

*means connected to said generator and said tubes for conveying said steam into said tubes for further heating and activating said steam combustion of said mixture to form gases from said steam,*

*a microporous membrane adapted to diffuse hydrogen, and*

*feeding means connected to said tubes and said microporous membrane for feeding said gases from said activated steam from said tubes to said microporous membrane, wherein said microporous membrane diffuses only hydrogen therethrough, to thereby produce the hydrogen from water.*

*10. Energy generating system, as set forth in claim 9, in which there are eight of said tubes spaced about said combustion chamber.*

*11. Energy generating system, as set forth in claim 9, in which said microporous membrane is asymmetric, and comprises a thick, dense polymer layer disposed about the circumference of a porous substrate through which only hydrogen diffuses.*

* * * * *